(12) United States Patent
Crombez et al.

(10) Patent No.: US 9,746,543 B2
(45) Date of Patent: Aug. 29, 2017

(54) LOCALISATION SYSTEM

(71) Applicant: Televic Healthcare NV, Izegem (BE)

(72) Inventors: Pieter Crombez, Torhout (BE); John Gesquiere, Poperinge (BE)

(73) Assignee: Televic Healthcare NV, Izegem (BE)

( * ) Notice: Subject to any disclaimer, the term of this patent is extended or adjusted under 35 U.S.C. 154(b) by 0 days.

(21) Appl. No.: 15/107,745

(22) PCT Filed: Jan. 5, 2015

(86) PCT No.: PCT/EP2015/050069
§ 371 (c)(1),
(2) Date: Jun. 23, 2016

(87) PCT Pub. No.: WO2015/097314
PCT Pub. Date: Jul. 2, 2015

(65) Prior Publication Data
US 2016/0320468 A1    Nov. 3, 2016

(30) Foreign Application Priority Data

Dec. 24, 2013 (EP) .................................. 13199600

(51) Int. Cl.
*G01S 13/74* (2006.01)
*G01S 5/02* (2010.01)
(Continued)

(52) U.S. Cl.
CPC .......... *G01S 5/0263* (2013.01); *G01S 5/0236* (2013.01); *G01S 5/0294* (2013.01); *G01S 13/74* (2013.01);
(Continued)

(58) Field of Classification Search
CPC ..................................................... G01S 5/0231
(Continued)

(56) References Cited

U.S. PATENT DOCUMENTS 5,917,425 A    6/1999 Crimmins et al.
7,295,132 B2   11/2007 Steiner
(Continued)

FOREIGN PATENT DOCUMENTS

EP    2565674 A1    3/2013
EP    2469298 B1    2/2015
(Continued)

OTHER PUBLICATIONS

International Preliminary Report on Patentability mailed Jul. 7, 2016 from Application No. PCT/EP2015/050071 filed Jan. 5, 2015.
(Continued)

*Primary Examiner* — Tashiana Adams
*Assistant Examiner* — Helena Seraydaryan
(74) *Attorney, Agent, or Firm* — Jacobsen IP Law; Krista S. Jacobsen

(57) ABSTRACT

The invention pertains to a method for detecting a tag (100) in an area monitored by one or more beacons (200), the tag (100) comprising a magnetic induction module (121) and a transmitter (140), the method comprising the following steps at said tag: receiving, by means of said magnetic induction module, a first beacon message as variations in a magnetic field, said first beacon message comprising beacon information; extracting said beacon information from said first beacon message; and conditionally on said beacon information, transmitting a localisation message by means of said transmitter (140).

19 Claims, 3 Drawing Sheets

(51) Int. Cl.
*G01V 15/00* (2006.01)
*G07C 9/00* (2006.01)
*G01V 3/10* (2006.01)
*G01V 3/12* (2006.01)

(52) U.S. Cl.
CPC .......... G01V 15/00 (2013.01); G07C 9/00111 (2013.01); *G01V 3/10* (2013.01); *G01V 3/12* (2013.01)

(58) Field of Classification Search
USPC .......................................... 340/10.4; 342/450
See application file for complete search history.

(56) References Cited

U.S. PATENT DOCUMENTS

| | | | |
|---|---|---|---|
| 7,489,242 | B2 | 2/2009 | Hines et al. |
| 7,541,942 | B2 | 6/2009 | Cargonja et al. |
| 7,751,829 | B2 | 7/2010 | Masuoka et al. |
| 7,768,392 | B1 | 8/2010 | Brand et al. |
| 7,830,250 | B2 | 11/2010 | Huseth et al. |
| 7,899,006 | B2 | 3/2011 | Boyd |
| 8,139,945 | B1 | 3/2012 | Amir et al. |
| 8,548,490 | B2 | 10/2013 | Wang et al. |
| 2002/0167417 | A1 | 11/2002 | Welles et al. |
| 2003/0030568 | A1 | 2/2003 | Lastinger et al. |
| 2006/0290519 | A1 | 12/2006 | Boate et al. |
| 2007/0139199 | A1 | 6/2007 | Hanlon |
| 2008/0100422 | A1* | 5/2008 | Tuttle .................... G01S 13/767 340/10.1 |
| 2008/0186233 | A1 | 8/2008 | McCoy |
| 2008/0252426 | A1* | 10/2008 | Lee ...................... G06K 7/0008 340/10.3 |
| 2009/0273465 | A1 | 11/2009 | Shamir et al. |
| 2011/0057779 | A1* | 3/2011 | Canard ................ H04L 9/3236 340/10.42 |
| 2013/0309964 | A1* | 11/2013 | Hall ........................ H04B 5/00 455/41.1 |
| 2014/0361903 | A1 | 12/2014 | Sawada |
| 2016/0260301 | A1 | 9/2016 | Miller et al. |

FOREIGN PATENT DOCUMENTS

| | | | | |
|---|---|---|---|---|
| WO | | 2007006085 | A1 | 1/2007 |
| WO | WO | 2007006085 | A1 * | 1/2007 .......... G06K 7/0008 |
| WO | | 2013105589 | A1 | 7/2013 |
| WO | | 2013169612 | A1 | 11/2013 |

OTHER PUBLICATIONS

Applicant's Demand for International Preliminary Examination (Chapter II PCT) submitted Oct. 8, 2015 from Application No. PCT/EP2015/050069 filed Jan. 5, 2015.
Extended European Search Report and European Search Report mailed May 23, 2014 from European Patent Application No. 13199600.1 filed Dec. 24, 2013.
Extended European Search Report and European Search Report mailed May 26, 2014 from European Patent Application No. 13199601.9 filed Dec. 24, 2013.
International Preliminary Report on Patentability mailed Dec. 8, 2015 from Application No. PCT/EP2015/050069 filed Jan. 5, 2015.
International Search Report and Written Opinion of the International Search Authority mailed May 19, 2015 from International Serial No. PCT/EP2015/050071 filed Jan. 5, 2015.
International Search Report and Written Opinion of the International Search Authority mailed Jun. 8, 2015 from International Serial No. PCT/EP2015/050069 filed Jan. 5, 2015.
Applicant's Reply to the Extended European Search Report and European Search Report mailed May 23, 2014, filed Jan. 4, 2016, from European Patent Application No. 13199600.1 filed Dec. 24, 2013.

* cited by examiner

LOCALISATION SYSTEM

FIELD OF THE INVENTION

The present invention relates to a wireless localisation system for movable objects or persons, such as a system to track the location of patients and/or assets in a facility such as a hospital. The invention also relates to a corresponding method, and a tag for use in same.

BACKGROUND

WO 2004/051303 A1 discloses a method and a system for monitoring and position determination of objects and/or living beings within an area, such as, e.g. a room in a building or a road tunnel. The system comprises a plurality of identification tags equipped with an ultrasonic receiver and radio transmitter which is attached to the objects that have to be monitored. The identification tags receive ultrasonic signals whose arrival time they measure. This information together with the identification tags' ID code are transmitted by radio waves to a central unit which calculates the position of each of the identification tags.

It is a disadvantage of the known system that it does not offer sufficiently high spatial accuracy to provide true access/exit control, nor sufficiently high temporal accuracy to allow for immediate responses to critical tracking events.

European patent application EP 2 469 298 A1 in the name of the present applicant, discloses a method and device for determining location of a target, using mobile tags and fixed beacons, wherein the target location is estimated from a weighted sum of the indications of the received signal power of at least two received signals. It is a disadvantage of this system that multiple received signals must be available to perform RSSI triangulation.

SUMMARY OF THE INVENTION

According to an aspect of the present invention, there is provided a method for detecting a first tag in an area monitored by one or more beacons, the first tag comprising a magnetic induction module and a transmitter, the method comprising the following steps at the first tag:
   receiving, by means of the magnetic induction module, a first beacon message as variations in a magnetic field, the first beacon message comprising beacon information;
   extracting the beacon information from the first beacon message;
   conditionally on the beacon information, transmitting a localisation message by means of the transmitter.

It is an advantage of the present invention that it can provide an extremely high spatial accuracy of the location of the identification tag, due to the short range of magnetic induction based communication. As the movement of the identification tag into and out of the range of various beacons can be traced in real time, the temporal accuracy is also increased. The conditional nature of the response of the identification tag increases the energy efficiency, and allows a larger number of identification tags to share the transmission medium (in particular, the assigned radio spectrum). By judiciously choosing the response conditions, the effectiveness of the monitoring system is preserved.

In an embodiment of the method according to the present invention, the transmitter comprises a radio frequency transmitter.

It is an advantage of this embodiment that a signal containing location information can be broadcast reliably and efficiently by the identification tag, for instance to the nearest beacon, in order to inform the central system of the identification tag's present location.

In an embodiment of the method according to the present invention, the first beacon message is broadcast by one of the beacons, the one of the beacons being located in a zone, the beacon information comprises information pertaining to the zone, and the conditionally transmitting a localisation message comprises comparing the information to one or more zones stored on the first tag.

It is an advantage of this embodiment that the behavior of the identification tag can be made dependent on the detected location.

In an embodiment of the method according to the present invention, the beacon information comprises an instruction adapted to control an operation of the first tag.

It is an advantage of this embodiment that the behavior of the identification tag can be controlled by a central system as desired in function of the circumstances.

In an embodiment of the method according to the present invention, the beacon information comprises operating range information, and the method further comprises: conditionally on the operating range information, reducing a sensitivity of the magnetic induction module.

It is an advantage of this embodiment that an identification tag that has approached an access control point can be turned into an access badge which will only trigger access authentication if it is brought into a very close range of the beacon (the range covered by the reduced sensitivity of the magnetic induction module).

In a particular embodiment, the reducing of the sensitivity of the magnetic induction module comprises electronically modifying a tuned circuit of the magnetic induction module by adding or removing a capacitive or inductive component.

This is a particularly efficient way of providing the sensitivity switching function in the identification tag.

In a particular embodiment, the method according to the present invention further comprises switching the first tag to a continuously receiving mode.

While the identification tag may be configured to operate according to a certain duty cycle in order to save energy, it may be instructed to switch to a full-time responsive mode when it has been put into short range (reduced sensitivity) mode, to reduce the latency of any subsequent access authentication request.

In a particular embodiment, the method according to the present invention further comprises receiving a second beacon message while the sensitivity is reduced, and transmitting an access request message.

This embodiment can be used to implement the access authentication request functionality.

In an embodiment, the method according to the present invention further comprises switching a second tag to a beacon mode, wherein the beacon message is received from the second tag.

It is an advantage of this embodiment that it provides direct tag-to-tag communication. Thus, a tag owned by a supervisor (nurse, guard, etc.) may temporarily be switched into "beacon mode", whereupon other nearby tags may receive the supervisor's beacon message and enter a "paired" mode. The paired state of the first and second tags may be used as a trigger to treat wandering events and access requests by one or both of these tags differently than when the tags are not paired.

According to an aspect of the present invention, there is provided a computer program product comprising code means configured to cause a processor to perform the functions of the first tag in the method according to any of the preceding claims.

According to an aspect of the present invention, there is provided an identification tag for use in a location system for determining a location of the identification tag in an area monitored by at least one beacon, the at least one beacon being adapted to broadcast beacon messages as variations in a magnetic field, which beacon messages comprise beacon information; the identification tag comprising: a magnetic induction module configured to convert a varying magnetic field into an electrical signal; a processing module adapted to decode the electrical signal and to extract a first beacon message therefrom; and a transmitter adapted to transmit a localisation message; wherein the tag is configured to transmit a localisation message, conditionally on the beacon information, by means of the transmitter.

In an embodiment of the identification tag according to the present invention, the transmitter comprises a radio frequency transmitter.

In an embodiment of the identification tag according to the present invention, the tag is further configured to selectively adapt a sensitivity of the magnetic induction module in function of operating range information comprised in the beacon information.

In a particular embodiment, the identification tag further comprises sensitivity switching means configured to electronically modify a tuned circuit of the magnetic induction module by adding or removing a capacitive or inductive component.

According to an aspect of the present invention, there is provided a system comprising a first tag as described above and a beacon for use in the method as described above.

The technical effects and advantages of embodiments of the computer program product, the identification tag, and the system according to the present invention correspond mutatis mutandis to those of the corresponding embodiments of the identification tag according to the invention.

BRIEF DESCRIPTION OF THE FIGURES

These and other features and advantages of embodiments of the present invention will now be described in more detail with reference to the accompanying drawings, in which.

DETAILED DESCRIPTION OF EMBODIMENTS

Figure 1:
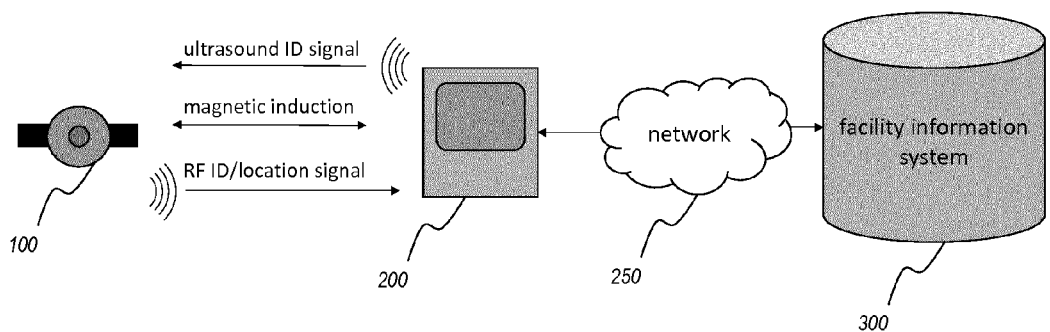
FIG. 1 schematically illustrates a localisation system comprising beacons and tags according to an embodiment of the present invention.

FIG. 1 schematically illustrates a location system comprising beacons and tags according to an embodiment of the present invention.

A specific application of the location system described herein is a wireless nurse call system for use in hospitals and other institutions where patients may move about, possibly without being fully conscious of their own exact location. Where appropriate, the invention will be described with reference to such a nurse call system, without intent to limit the scope of the invention to such applications. In the context of a wireless nurse call system, the development of efficient hardware is an important goal, with a view to reducing (battery) power consumption, obtaining a small form factor, and keeping the total cost as low as possible.

Additionally, the system should provide a very accurate determination of the tag's location, both in the spatial dimension (high spatial accuracy) and in the time dimension (low latency tracking), such that adequate responses to tracking events can be deployed immediately and at the right place.

In the preferred localisation system, beacons 200 are provided at fixed locations throughout an area in which the location of mobile objects or persons is to be monitored. The beacons may generally be mounted to walls, doors, pillars, and the like. They may have a basic user interface comprising a display and one or more keys. The mobile objects or persons to be monitored are provided with identification tags (hereinafter also referred to as "tags") 100. The beacons 200 emit a signal comprising an identification element, which can be received and decoded by the tags 100.

The beacons may optionally emit an identification element modulated onto an ultrasound signal. Ultrasound communication is based on electromechanically induced vibrations that generate propagating longitudinal acoustic waves. As ultrasound waves are, by definition, in a frequency range beyond the audible range for humans, their use is no hindrance to humans present in the monitored area. Within building environments, ultrasound waves are almost completely blocked by walls (contrary to electromagnetic waves). Ultrasound waves are therefore a suitable signal type to obtain room-level localisation accuracy. If ultrasound localisation is used, the mobile objects or persons to be monitored are provided with tags 100 which comprise an ultrasound receiver. Upon receiving the beacon identification element encoded in the ultrasound signal, the tag 100 will be aware of its location (in the sense of being able to identify the nearest beacon 200) down to room-level accuracy, without any need for triangulation.

It is a goal of the tags according embodiments of the present invention to detect proximity to sensitive points in the monitored area, such as doors or gates between divisions of a building or building complex, and places where critical objects are kept (e.g., emergency equipment or drugs). This function requires a localisation mechanism that is even more accurate, both in terms of spatial resolution and in terms of latency, than the ultrasound-based system described above. Embodiments of the present invention are based inter alia on the insight of the inventors that this goal can be met by using magnetic induction to achieve very short-range detection and communication (a typical range extends from approximately 10 cm to approximately 1 m; for some applications, a range up to 5 m may be used). To this end, the beacons are adapted to receive a beacon signal, including a beacon identification element, by means of magnetic induction, in the form of a varying magnetic field.

Embodiments of the method and tag according to the present invention will now be described with reference to FIG. 2.

According to the invention, a method of detecting a first tag 100 in an area monitored by one or more beacons 200, the first tag 100 comprising a magnetic induction module 120 and a transmitter 140, comprises the following steps at the first tag: receiving, by means of the magnetic induction module 120, a first beacon message as variations in a magnetic field, the first beacon message comprising beacon information; extracting the beacon information from the first beacon message; and, conditionally on the beacon information, transmitting a localisation message by means of the transmitter 140.

The beacon message may be received from a beacon 200. In a pairing situation, which will described below, the beacon message may also be received from another tag (not shown).

Preferably, the tag also comprises an ultrasound receiver 110, as described above, for receiving beacon identification messages transmitted by near-by beacons via ultrasound acoustic transmission, as described in more detail above.

The tag 100 comprises a transmitter 140 to relay the decoded beacon identification element, along with its own identity, to the central monitoring system. The transmitter 140 may include a radio frequency (RF) transmitter adapted to wirelessly communicate the information to a beacon (the same beacon whose identification element was received and/or another beacon within radio range), which is in turn preferably connected to a wired or wireless network 250 that allows it to communicate with a centralized management system 300. Alternatively, the transmitter 140 uses the magnetic induction module to transmit the localisation message by producing variations in a magnetic field.

As the range of magnetic induction and RF transmissions is limited in practice, the identity of the beacon 200 at which the signal of the tag 100 is received provides a clue to the location of the tag 100. In the case of RF transmission, this localisation step is coarser than the ultrasound-based localisation, because the range of an RF transmission with typical properties (e.g., using the legally permitted transmit power in the unlicensed ISM bands at 434 MHz, 2.4 GHz, or 5 GHz, or the SRD 860 band) will be longer than that of an ultrasound transmission, and will in particular not significantly be constrained by walls. The combination of RF-based localisation at a coarse level and ultrasound-based localisation at a finer level allows for a cellular naming system for the beacons; i.e., the beacon identities transmitted in the ultrasound signal need only be unique within the set of beacons with overlapping ultrasound communication ranges. This allows for a shorter "beacon identity" field to be used in the messages conveyed by the ultrasound signals, which in turn leads to a lower average data rate and thus lower power consumption at the transmitter (beacon) and the receiver (tag).

Whether or not the identification tag 100 transmits a localisation message in response to a given received beacon message, is conditional on information in the beacon message. Several types of information in the beacon message may be used by the identification tag 100 to make this assessment.

The behavior of the identification tag may be made location dependent. If the tag is able to determine where it is, it can adapt its behavior accordingly. One way of accomplishing this, is be including zone information in the beacon message transmitted by the fixed beacon(s). Thus, in an embodiment of the method according to the present invention, the first beacon message is broadcast by one of the beacons, the one of the beacons being located in a zone, the beacon information comprises information pertaining to the zone, and the conditionally transmitting a localisation message comprises comparing the information to one or more zones stored on the first tag. Based on this comparison, the identification tag 100 will determine what behavior is required given the zone it is in. For instance, the identification tag 100 may dispense with the transmission of location messages as long as it determines it is in its home zone, or in a designated "silent zone". Additionally or alternatively, the beacon information may comprise an instruction adapted to control an operation of the first tag. This allows the operator of the system to influence the behavior of the tags according to the time of day, or in response to specific events, such as emergencies.

In a particularly preferred embodiment, the beacon information comprises operating range information, and the method further comprises, conditionally on the operating range information, reducing a sensitivity of the magnetic induction module.

The tag preferably comprises a coil, coupled to an appropriately tuned electronic circuit, to convert a detected varying magnetic field having a specific target frequency into an electrical signal that may be further processed. The reducing of the sensitivity of the magnetic induction module may comprise electronically modifying a tuned circuit of the magnetic induction module by adding or removing a capacitive or inductive component. Thus, the electronic circuit is preferably designed in such a way that it can be deliberately and reversibly detuned (in particular, by dynamically switching an additional capacitance or inductance into the tuning circuit by means of appropriately controlled transistors). By detuning the tuning circuit, the effective range of the magnetic inductance receiver can be deliberately reduced. This allows the tag to discriminate between "general proximity" to the beacon (e.g., walking past a beacon while wearing a tag) and "extreme proximity" to the beacon (e.g., holding the tag up close to the beacon's housing), because any signal received in reduced sensitivity mode is indicative of being in very close range (extreme proximity) of the beacon. Depending on the desired application, the "general proximity" may be used to trigger an alert that somebody is approaching a sensitive zone, such as an exit which a monitored person is not authorized to use (thus, it may be detected when patients wander out of their ward or their designated zone).

Depending on the desired application, the "extreme proximity" may be used as a trigger to perform an authentication that may lead to the opening of a door or a gate and the like. In embodiments of the present invention, the beacon may indicate its type in the signal it emits by magnetic induction. The tag may be configured to detune its magnetic induction circuit as described above only when receiving an indication that the beacon is of a type that requires extreme proximity to trigger a particular action. In like manner, the tag may switch to a continuously receiving mode when it switches to reduced sensitivity mode. In that way, the tag becomes a short-range access badge, which is only triggered if it is brought into close range of the access control beacon, without requiring the use of different beacon hardware for access control beacons and for general localisation beacons. When in range with reduced sensitivity, the tag may receive a second beacon message, and then transmit an access request message. This access request message may be sent directly to the same beacon by means of magnetic induction, if the tag is so configured, or, more preferably, it may be broadcast by RF transmission and picked up by any one of the beacons within RF range or another RF receiver coupled to the central system.

Access control may be implemented in several different ways. Access to a zone may be restricted, by locking doors that are normally open upon the approach of a non-authorized person, as detected by the localisation signal emitted by this person's tag upon approaching the door's beacon. Conversely, access may be regulated by unlocking doors that are normally locked upon the approach of an authorized person, optionally after performing a "badging" action consisting of triggering the reduced-sensitivity mode of the approaching person's tag, transmitting another beacon message, and receiving an appropriate localisation message from the tag in question.

In embodiments of the present invention, a first tag receives the beacon message from a second tag, which is capable of being temporarily switched to a "beacon mode", in which it transmits beacon messages through magnetic induction communication. This "beacon mode" thus allows at least unidirectional tag-to-tag communication. This feature forms the basis for use cases in which tags are logically paired to one another. Additionally or alternatively, this feature can form the basis for sending short instructions from the second tag to the first tag, such as configuration instructions or activation/deactivation of ancillary features of the first tag (reading light, alarm clock, . . . ).

Preferably, the first tag and/or the second tag transmit a pairing message to the monitoring system via one or more fixed beacons, to indicate that the first tag and the second tag are paired or about to be paired. Once paired, the central system may apply different access and alarm rules for the paired tags. In particular, the paired state of the first and second tags may be used as a trigger to treat wandering events and access requests by one or both of these tags differently. Accordingly, in a hospital scenario, a patient may be granted access to a certain area that is normally restricted, only when his tag is paired with the tag of a nurse, assuming that the nurse's tag is also presented at the access control beacon. In another scenario, a detained person may be allowed to wander around freely in a designated zone as long as his badged is paired with the badge of an approved visitor or a guard.

While the pairing is only a logical state, and not a physical state, it may be useful to alert the users to the paired state by means of indicators on one or both of the tags. These indicators may be visual, such as a lit or blinking LED or an indicator on an LCD screen, or auditory, such as a continuous series of low-volume beeps.

The paired state may expire after a preset amount of time. Additionally or alternatively, the paired state may be terminated by an instruction entered in the central system. Additionally or alternatively, the paired state may be terminated by a specific interaction with the first tag and/or the second tag (e.g., pushing a button provided for that purpose).

The functional architecture of an identification tag 100 according to an exemplary embodiment of the present invention will now be described in more detail with further reference to FIG. 2. FIG. 2 illustrates an identification tag for use in a location system for determining a location of the identification tag in an area monitored by at least one beacon, the at least one beacon being adapted to broadcast beacon messages as variations in a magnetic field, which beacon messages comprise beacon information;

the identification tag comprising: a magnetic induction module 120 configured to convert a varying magnetic field into an electrical signal; a processing module 135 adapted to decode the electrical signal and to extract a first beacon message therefrom; and a transmitter 140 adapted to transmit a localisation message; wherein the tag 100 is configured to transmit a localisation message, conditionally on the beacon information, by means of the transmitter 140.

Figure 2:
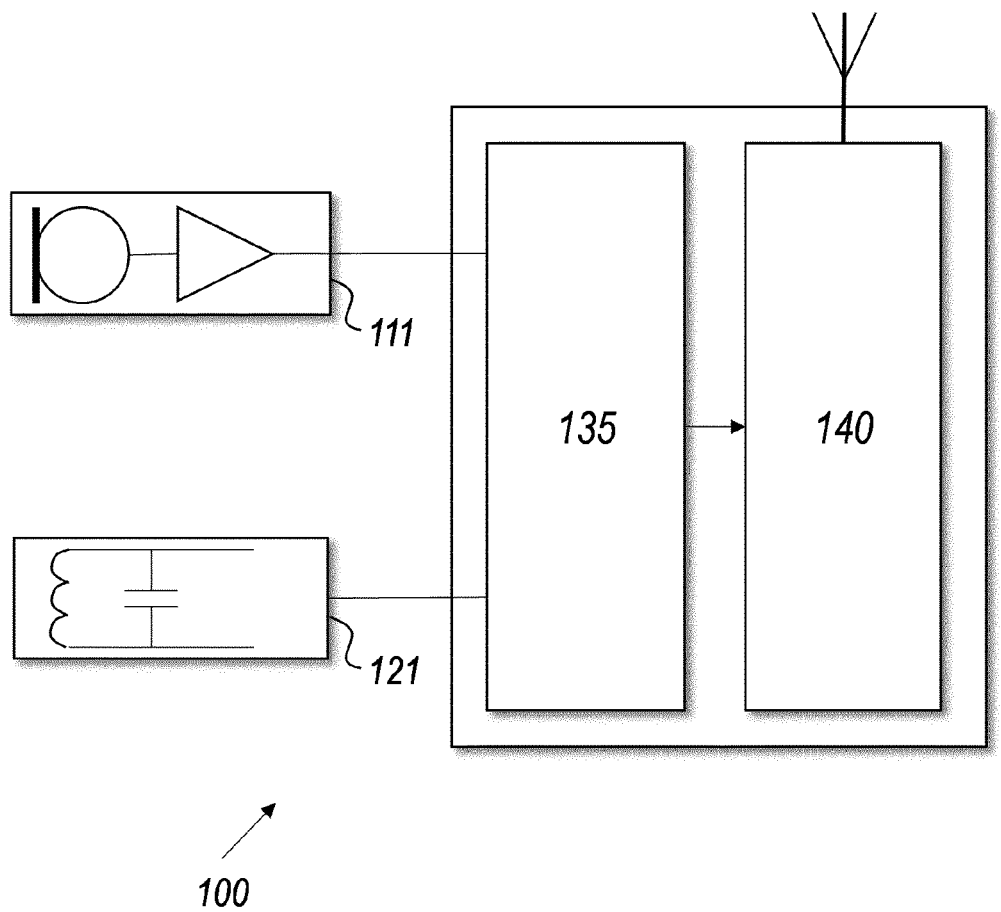
FIG. 2 schematically illustrates elements of an identification tag according to an embodiment of the present invention.

As the invention can be understood without reference to common elements like the battery, power manager, user interface, and the like, these elements have not been included in FIG. 2, to keep the latter clear.

The processing module 135 may act as a common front-end and performs synchronization and decodes the respective electrical signals obtained from the electromechanical (ultrasound) signal and the electromagnetic (magnetic induction) signal. Hence, the hardware used to convert the ultrasound waves into an electrical signal, herein also referred to as the ultrasound receiver module 110, and the hardware used to perform magnetic induction coupling, herein also referred to as the magnetic induction module 120, are both coupled to the same processing module 135. The processing module 135 is further connected to the transmitter 140. The processing module 135 decodes the digital signals, so as to retrieve or extract the transmitted information, and carries out the assessment of the conditions for transmission of a localisation message in response to the beacon message.

The ultrasound receiver module 110 has a channel interface comprising mainly a microphone element with an appropriate frequency response for the used ultrasound signals. The magnetic induction module 120 has a channel interface comprising mainly a coil or ferrite antenna and a resonance circuit. These components, and the necessary ancillary components, are only illustrated schematically.

The functions described hereinabove as pertaining to the processing module 135 may be implemented in dedicated hardware (e.g., ASIC), configurable hardware (e.g., FPGA), programmable components (e.g., a DSP or general purpose processor with appropriate software), or any combination thereof. The same component may also include other functions, including parts of the ultrasound receiver module 110 and/or parts of the magnetic induction module 120. The present invention also pertains to a computer program, optionally stored on a computer-readable medium, comprising code means adapted to cause a processor to perform the functions of the identification tag 100 as described above.

Figure 3:
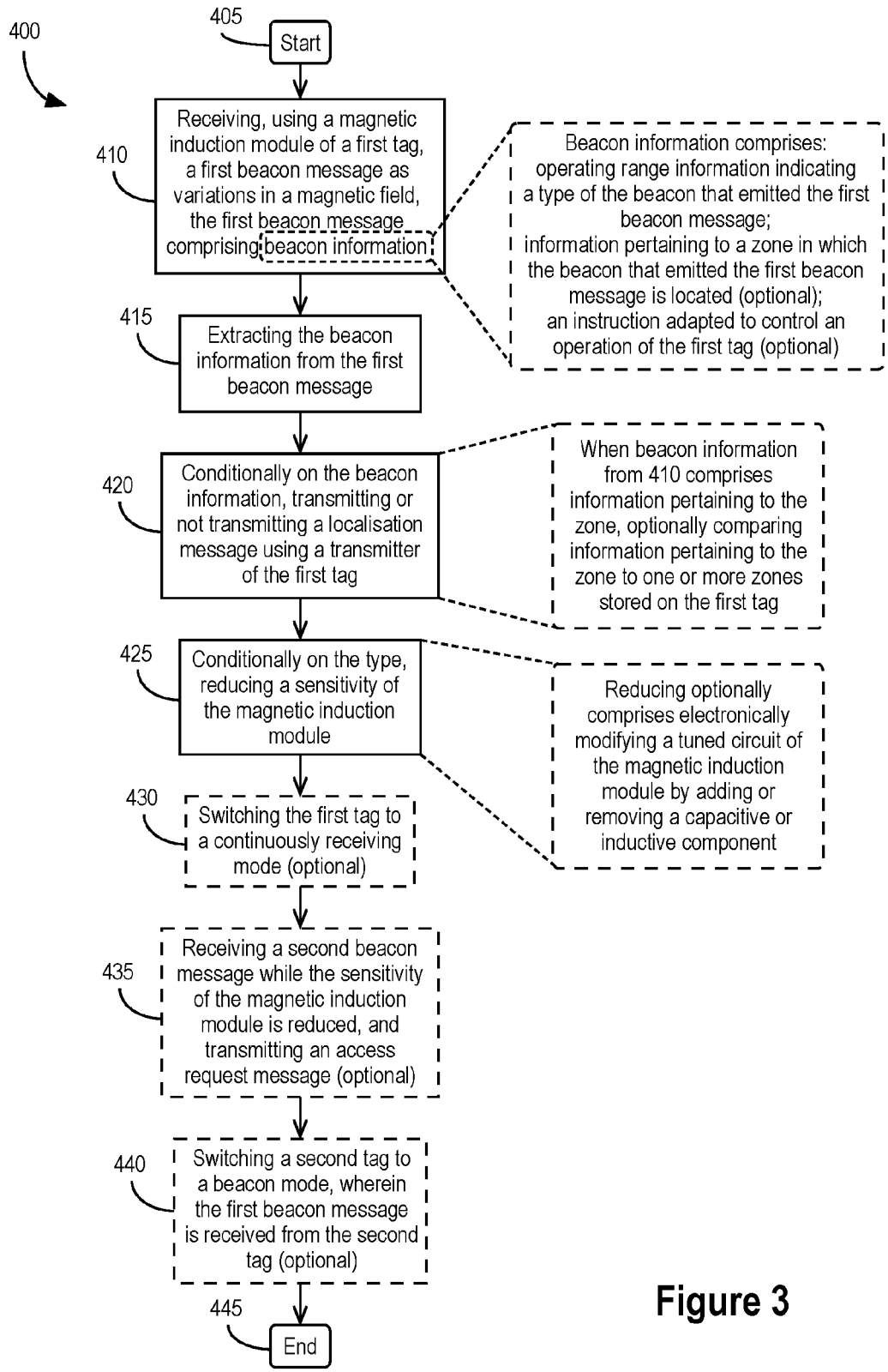
FIG. 3 is a flowchart illustrating a method for detecting a first tag in an area monitored by one or more beacons in accordance with some embodiments.

FIG. 3 is a flowchart that illustrates a method 400 for detecting a first tag in an area monitored by one or more beacons, the first tag comprising a magnetic induction module and a transmitter. At 405, the method 400 starts. At 410, the first tag receives, using the magnetic induction module, a first beacon message as variations in a magnetic field. The first beacon message comprises beacon information. The beacon information comprises operating range information indicating a type of one of the one or more beacons that emitted the first beacon message. Optionally, the beacon message comprises information pertaining to a zone in which the beacon that emitted the first beacon message is located, and/or an instruction adapted to control an operation of the first tag. At 415, the first tag extracts the beacon information from the first beacon message. At 420, conditionally on the beacon information, the first tag transmits or does not transmit a localisation message using the transmitter. When the beacon information comprises information pertaining to the zone in which the beacon that emitted the first beacon message is located, the first tag optionally compares information pertaining to the zone to one or more zones stored on the first tag. At 425, conditionally on the type, the first tag reduces a sensitivity of the magnetic induction module. Optionally, reducing the sensitivity of the magnetic induction module comprises electronically modifying a tuned circuit of the magnetic induction module by adding or removing a capacitive or inductive component. The method 400 may optionally continue to 430, where the first tag switches to a continuously receiving mode. In addition or alternatively, the method 400 may optionally continue to 435, where the first tag receives a second beacon message while the sensitivity of the magnetic induction module is reduced, and transmits an access request message. In addition or alternatively, the method 400 may optionally continue to 440, where a second tag is switched to a beacon mode, wherein the first beacon message is received from the second tag. At 445, the method 400 ends.

While the invention has been described hereinabove with reference to specific embodiments, this is done to illustrate and not to limit the invention, the scope of which is defined by the accompanying claims. The skilled person will readily appreciate that different combinations of features than those described herein are possible without departing from the scope of the claimed invention.

The invention claimed is:

1. A method for detecting a first tag in an area monitored by one or more beacons, the first tag comprising a magnetic induction module and a transmitter, the method comprising the following steps at said first tag:
   receiving, using said magnetic induction module, a first beacon message as variations in a magnetic field, said first beacon message comprising beacon information;
   extracting said beacon information from said first beacon message;
   conditionally on said beacon information, transmitting or not transmitting a localisation message using said transmitter,
   wherein said beacon information comprises operating range information, said operating range information indicating a type of one of said one or more beacons that emitted said first beacon message, the type indicating whether the one of said one or more beacons requires the first tag to be in close proximity to the one of said one or more beacons to trigger a particular action, and wherein the method further comprises:
   when the type indicates that the one of said one or more beacons requires the first tag to be in close proximity to the one of said one or more beacons to trigger the particular action, reducing a sensitivity of said magnetic induction module.

2. The method according to claim 1, wherein said transmitter comprises a radio frequency transmitter.

3. The method according to claim 1, wherein said first beacon message is broadcast by said one of said one or more beacons, said one of said one or more beacons being located in a zone, wherein said beacon information comprises information pertaining to said zone, and wherein conditionally on said beacon information, transmitting or not transmitting the localisation message comprises comparing said information pertaining to said zone to one or more zones stored on said first tag.

4. The method according to claim 1, wherein said beacon information comprises an instruction adapted to control an operation of said first tag.

5. The method according to claim 1, wherein said reducing of said sensitivity of said magnetic induction module comprises electronically modifying a tuned circuit of said magnetic induction module by adding or removing a capacitive or inductive component.

6. The method according to claim 1, further comprising switching said first tag to a continuously receiving mode.

7. The method according to claim 1, further comprising receiving a second beacon message while said sensitivity of said magnetic induction module is reduced, and transmitting an access request message.

8. The method according to claim 1, further comprising switching a second tag to a beacon mode, wherein said first beacon message is received from said second tag.

9. A non-transitory computer-readable medium storing machine-executable instructions that, when executed by a processor, cause the processor to perform the functions of said first tag in the method recited in claim 1.

10. An identification tag for use in a location system for determining a location of the identification tag in an area monitored by at least one beacon, said at least one beacon being adapted to broadcast beacon messages as variations in a magnetic field, which beacon messages comprise beacon information, the identification tag comprising:
    a magnetic induction module configured to convert a varying magnetic field into an electrical signal;
    a processing module adapted to decode said electrical signal and to extract a first beacon message therefrom; and
    a transmitter adapted to transmit a localisation message,
    wherein said identification tag is configured to transmit or not to transmit the localisation message, conditionally on said beacon information, using said transmitter,
    wherein said beacon information comprises operating range information indicating a type of a particular beacon of the at least one beacon that emitted said first beacon message, the type indicating whether the particular beacon requires the first tag to be in close proximity to the particular beacon to trigger a particular action; and
    wherein said identification tag is further configured to reduce a sensitivity of said magnetic induction module when the type indicates that the particular beacon requires the first tag to be in close proximity to the particular beacon to trigger the particular action.

11. The identification tag according to claim 10, wherein said transmitter comprises a radio frequency transmitter.

12. The identification tag according to claim 10, further comprising sensitivity switching means configured to electronically modify a tuned circuit of said magnetic induction module by adding or removing a capacitive or inductive component.

13. A system comprising:
    the identification tag according to claim 10; and
    the at least one beacon according to claim 10.

14. A non-transitory computer-readable medium storing machine-executable instructions that, when executed by a processor, cause the processor to perform the functions of said first tag in the method recited in claim 3.

15. A non-transitory computer-readable medium storing machine-executable instructions that, when executed by a processor, cause the processor to perform the functions of said first tag in the method recited in claim 5.

16. A non-transitory computer-readable medium storing machine-executable instructions that, when executed by a processor, cause the processor to perform the functions of said first tag in the method recited in claim 6.

17. A non-transitory computer-readable medium storing machine-executable instructions that, when executed by a processor, cause the processor to perform the functions of said first tag in the method recited in claim 7.

18. A system comprising:
    the identification tag according to claim 11; and
    the at least one beacon according to claim 11.

19. A system comprising:
    the identification tag according to claim 12; and
    the at least one beacon according to claim 12.

* * * * *